Patented May 28, 1929.

1,715,252

UNITED STATES PATENT OFFICE.

FREDERICK W. SPERR, JR., OF PITTSBURGH, PENNSYLVANIA, ASSIGNOR TO THE KOPPERS COMPANY, OF PITTSBURGH, PENNSYLVANIA, A CORPORATION OF PENNSYLVANIA.

GAS AND LIQUID CONTACT APPARATUS.

Application filed December 8, 1921. Serial No. 520,806.

This invention relates to gas and liquid contact apparatus, that is especially useful in the removal of hydrogen sulphide and other noxious constituents, such as hydrocyanic acid, from gases containing them. The invention has an important application in practicing a gas purification process operating generally in accordance with that process, described and claimed in the prior Letters-Patent of the United States of David L. Jacobson, dated September 6, 1921, No. 1,390,037. Broadly stated, such gas purification process consists in bringing the gas to be purified into direct contact with an alkaline absorbent agent, such as a solution of sodium carbonate, to absorb the noxious constituents from the gas, and then subjecting the absorbent agent containing the absorbed impurities to aeration to remove the absorbed impurities, whereby a rejuvenation of the absorbent agent is effected which renders the absorbent agent available for further gas purification. In carrying out the above stated gas purification process, there is required for the absorption stage a chamber in which the gas and absorbent agent are brought into direct contact with each other, and, in the regeneration stage in which the fouled solution is rejuvenated, there is similarly required a chamber having provision for bringing the fouled absorbent agent into direct contact with an aerating medium, such as atmospheric air. The present invention provides an efficient gas and liquid contact apparatus that is especially designed for producing the intimate contact between liquid and gas essential for carrying out either the absorption stage or the regeneration stage of the gas purification process above outlined. An important feature of the invention consists in a novel filler for the gas and liquid contact apparatus which functions not only to effect distribution of the gases and liquid throughout the apparatus but also to provide for intensive contact between such gases and liquid, and to avoid short circuiting of either the gas or liquid in restricted zones in the interior of the apparatus.

In addition to the general objects recited above, the invention has for further objects such other improvements or advantages in construction and operation as may be found to obtain in the structures and devices hereinafter described or claimed.

In the accompanying drawing, forming a part of this specification and showing, for purposes of exemplification, a preferred form and manner in which the invention may be embodied and practiced, but without limiting the claimed invention specifically to such illustrative instance:

Figure 1 is a vertical sectional elevation of a gas and liquid contact apparatus constructed in accordance with the improvements of the present invention; and Figure 2 is an enlarged sectional elevation of the interior of said apparatus, taken on the line 2—2 of Fig. 1.

The same characters of reference designate the same parts in each of the several views of the drawings.

In its present embodiment, the invention is applied to an absorber for effecting the removal of noxious constituents from gases. For convenience, the present description will be confined to this use of the invention. Features of the invention are, however, capable of other applications, for example the invention may be applied with equally satisfactory results to an apparatus for effecting regeneration of the fouled solution. Consequently, the invention is not limited in its scope to the specific use and specific embodiment herein described as an illustrative example.

Referring to the drawing and more particularly to Fig. 1, there is shown at 11 a suitable foundation provided with a well or sump 12 constituting a reservoir for liquid discharged from the bottom of the tower 13 supported on the top of the foundation 11. The tower 13 is constituted of a surrounding vertical wall and within the tower may be carried on the absorption stage, for example of a gas purification process. The gas to be purified enters the bottom of the tower through a gas inlet 14 and the purified gas passes out of the upper end of the tower through a discharge pipe 15 communicating with a separator which collects any spray that may be mechanically carried over with the gas. The liquid collected in this separator is, of course, drained into the main circulating system. The absorption solution is supplied to the upper end of the tower from a sprayer 16 connected with a solution supply line 17; and the fouled solution discharges from the bottom of the tower into the sump 12 from which the fouled solution may be pumped through a line 18 for subsequent regeneration or actification.

May 28, 1929.  H. STRAND ET AL  1,715,255
TOOL
Filed Oct. 19, 1925  2 Sheets-Sheet 2
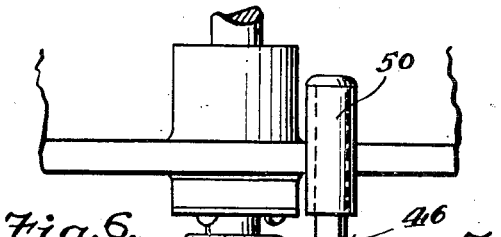

Patented May 28, 1929.

1,715,255

UNITED STATES PATENT OFFICE.

HENRY STRAND AND BYRON DE KALB JACKSON, OF CLEVELAND, OHIO.

TOOL.

Application filed October 19, 1925. Serial No. 63,485. REISSUED

This invention relates to machines for grinding or honing the cylinders of engines, such as the cylinders of the engines of automobiles, motor vehicles or the like.

The object of the invention is to provide a machine of this character embodying a novel form of expansible grinding tool wherein the grinding or honing elements are positively and automatically expanded to the proper degree during the grinding operation.

Another object is to provide a simple and compact though highly organized tool of durable construction and which is convenient and reliable in operation and easy and comparatively inexpensive to manufacture.

A further object is to provide a novel form of grinding element and a novel mounting therefor whereby the grit or the like incident to the operation is collected and whereby the grinding elements are rigidly and securely though removably held in assembly.

Other objects and advantages reside in certain novel features of the construction, arrangement and combination of parts which will be hereinafter more fully described and particularly pointed out in the appended claims, reference being had to the accompanying drawings forming a part of this specification, and in which:

Fig. 1 is a view in elevation showing a tool constructed in accordance with the principles of my invention, Fig. 2 is a view thereof in diametrical vertical section, Fig. 3 is a sectional view taken on line 3—3 of Fig. 2, Fig. 4 is a detail perspective view of one of the holders employed for each grinding element, Fig. 5 is a detail view in elevation showing one of the end plates, Fig. 6 is a view in elevation showing the power feed, Fig. 7 is a view in horizontal section on line 7—7 of Fig. 6, and Fig. 8 is a detail sectional view illustrating the slip fit mounting for the abutment rod, and, Figure 9 is a fragmentary view partly in section and partly in elevation.

Referring to the drawings and more particularly to Figs. 1 to 5 inclusive, it will be seen that the tool comprises an axial shaft 1 on which an expanding sleeve 2 is splined or otherwise slidably fitted. At the forward or lower end of the shaft 1 an end plate 3 is disposed and secured as by means of a pin 4. A similar end plate 5 for the other end of the tool is mounted on the sleeve 2. The end plates 3 and 5 are held against spreading by means of a plurality, preferably three, angularly spaced rods 6 extending longitudinally between and through the end plates. One end of each rod has a head 7 received in a countersunk opening 8 provided therefor in the end plate 5 and the end of each rod opposite its head is threaded and coacts with a nut 8 and washer 9, the washer 9 being pressed against the outer face of the end plate 3 by its nut 8 to hold the end plate 3 in position.

A plurality of holders designated generally at 10 are provided for carrying the grinding elements, the holders extending longitudinally between and being mounted on the end plates. Each holder comprises an elongated and substantially channel shaped body made up of a base wall 11 and side walls 12. At each end of the base wall 11 undercut end walls 13 are integrally formed and have integral inwardly extending lugs 14. Tongues 15 are integrally formed with the end walls 13 and lugs 14. In the assembly the tongues 15 are slidably fitted in grooves 16 formed in the confronting faces of the end plates 3 and 5 to constrain the holders to radial movements.

The grinding elements which are of carborundum or the like consist of a pair of sections 17 mounted in the channel shaped body of each holder, the section of each element being arranged in end to end relation in their holder end having their remote beveled ends 18 forced into engagement with the undercut end walls 13 of their holder by means of a clamping block 19 having its side faces undercut and engaging the adjacent beveled faces 20 of the sections 17 under the action of a screw 21 extending through the block and threadedly engaged with the base of the holder. The sections 17 of the grinding elements have central longitudinal channels or slots 22 located between the grinding surfaces 23 of each grinding element and serving to collect grit or the like whereby to enhance the grinding action.

The holders 10 are expanded by means of two spaced expanders designated generally at 25. Each expander 25 has a hub 26 fixed on the tube 2 and provided with three integral expanding arms 27, there being one arm 27 on each expander 25 for each holder 10. The arms 27 have beveled or inclined cam surfaces 28 at their outer ends engageable with inclines 29 integrally formed with the holders 10 on their inner sides. Both inclines 29 of each holder 10 are integral with the base section of the holder on which they are mounted and one such incline 29 is also integral with a lug 14 while the other incline of the same holder is integral with a cross plate 30 formed between parallel ribs 31 provided on the underside of the base section of each holder. The cross plates 30 having inwardly tapering extensions 32 slidable in grooves 33 formed in the tube 2 to aid the tongues 15 and grooves 16 in constraining the holders to radial adjustment.

Spring means is provided for holding the inclines 29 of the holders against their expanders and comprises a blade spring 35 for each holder, each spring 35 having one end fixed to one of the arms 27 and having its opposite end portion engaged with a cross pin 36 carried by the ribs 31. The springs 35 operate between the ribs 31.

The tool described is rotated and reciprocated by the conventional power mechanism widely employed in the art and organized with this mechanism is an automatic power feed for the expanding means. As shown the shaft 1 of the tool is extended beyond the same and is coupled to the power drive 42 and the expanding sleeve 2 is also extended beyond the tool. The extension of the shaft is externally threaded as indicated at 40. A feed nut 45 is threaded on the portion 40 and has a tubular connection 43 with the sleeve 2, the tubular connection or sleeve 43 being a press fit on the sleeve 2 and loosely abutting the feed nut. A lateral pin 44 is fixed to the flange of the feed nut and is periodically engageable with the lower section of an extensible abutment rod designated generally at 46. The rod 46 includes a tubular upper section 47 in which a lower section 48 is adjustably fitted. A set screw 49 holds the sections 47 and 48 in the desired adjustment. The tubular section 47 has a head 50 provided with a transverse slot 51 defined by parallel walls in the head. The slot 51 is somewhat elongated and slidably receives a squared portion 52 of the frame in such manner that the abutment rod is a slip fit on the frame, that is, the abutment rod may slide up and down but cannot swing or rotate or in other words cannot move angularly relative to the frame. By varying the length of the abutment rod the frequency of the engagement of the pin 46 with the rod 48 may be varied whereby the expansion of the grinding elements may be regulated to suit conditions. In considering the phase of the operation it must be borne in mind that the entire assembly is not only rotated but moved up and down, that is reciprocated. The slip fit between the abutment rod and the frame provides the necessary lost motion to take care of that phase of the operation wherein the pin 46 rises directly beneath and engages the lower end of the section 48 of the rod 46. Of course, when the pin 46 strikes the periphery of the lower section 48 of the rod 46 the feed nut is held for a short interval while the rest of the assembly continues to rotate, thereby advancing the feed nut on the shaft 1 and causing the sleeve 2 through the connection 43 to advance along its shaft 1 whereby to cause the expanders 25 carried thereby to expand the holders and their grinding elements to a slight extent. The engagement of the pin 46 and abutment rod occurs periodically and occupies only a short interval since the pin 46 slides down off of the abutment rod when the assembly partakes of the downward phase of its reciprocatory movement. In this way the requisite expansion is carried out automatically so that an effective grinding or honing action may be had without manual attention to the expansion means.

I claim:

1. In combination, a grinding tool including a drive shaft, grinding elements carried by the shaft adapted for radial movement with respect to the shaft, a sleeve slidable upon the shaft, means whereby with longitudinal movement of the sleeve in one direction the same will impart outward movement to the grinding elements, and means for imparting intermittent longitudinal movement to the sleeve.

2. In a device of the character described, a rotatable body, means for rotating the body, radially movable grinding elements carried by the body, and means for intermittently imparting radial outward movement to the grinding elements.

3. In a device of the character described, a rotatable body, a plurality of radially disposed grinding elements carried by the body, a sleeve longitudinally movable between the grinding elements, and means operable incident to slidable movement of the sleeve in one direction to shift the grinding members in an outward radial direction, and means for intermittently imparting slidable movement to the sleeve.

4. In combination, a rotatable body, a plurality of radially movable abrasive elements supported thereby, a drive shaft passing centrally through and attached to the body, a sleeve slidable on the shaft, means for automatically feeding the sleeve in a longitudinal direction, and cooperating means between the sleeve and abrasive elements for feeding them gradually in an outward direction.

5. In a grinding device, a pair of parallel end plates rigidly connected together, abrasive carrying members supported between the plates for radial movement, inclined members on the inner faces of the abrasive carrying members, a longitudinally movable expansion member arranged between the abrasive carrying members, means for intermittently feeding the expansion member in one direction, and bevelled expanding elements carried by the expansion member and movable over the inclined members, whereby to gradually feed the abrasive carrying members in an outward direction incident to the movement of the expansion member in one direction.

HENRY STRAND.
BYRON DE KALB JACKSON.